(12) United States Patent
Bodensteiner et al.

(10) Patent No.: US 9,109,657 B2
(45) Date of Patent: Aug. 18, 2015

(54) LINK CHAIN WITH INCLINED PLATE BACKS

(71) Applicant: IWIS MOTORSYSTEME GMBH & CO., KG, Munich (DE)

(72) Inventors: Martin Bodensteiner, Munich (DE); Renzo Perissinotto, Dachau (DE)

(73) Assignee: IWIS MOTORSYSTEME GMBH & CO., KG, Munich (DE)

( * ) Notice: Subject to any disclaimer, the term of this patent is extended or adjusted under 35 U.S.C. 154(b) by 57 days.

(21) Appl. No.: 13/753,919

(22) Filed: Jan. 30, 2013

(65) Prior Publication Data

US 2013/0196804 A1  Aug. 1, 2013

(30) Foreign Application Priority Data

Jan. 31, 2012 (DE) .......................... 10 2012 001 812

(51) Int. Cl.
| | |
|---|---|
| F16G 13/02 | (2006.01) |
| F16H 7/06 | (2006.01) |
| F16G 13/04 | (2006.01) |
| F16G 13/06 | (2006.01) |
| F16G 13/08 | (2006.01) |

(52) U.S. Cl.
CPC ................ *F16G 13/02* (2013.01); *F16G 13/04* (2013.01); *F16G 13/06* (2013.01); *F16G 13/08* (2013.01); *F16H 7/06* (2013.01)

(58) Field of Classification Search
CPC ......... F16G 13/02; F16G 13/04; F16G 13/06; F16G 13/08; F16H 7/06
USPC .................................. 474/140, 230, 148, 206
See application file for complete search history.

(56) References Cited

U.S. PATENT DOCUMENTS 4,650,445 A * 3/1987 Mott ............................ 474/201
5,154,674 A * 10/1992 Avramidis et al. ............ 474/214
(Continued)

FOREIGN PATENT DOCUMENTS

DE          19907865 A1    9/1999
DE      102008033900 A1    2/2009
(Continued)

*Primary Examiner* — Michael Mansen
*Assistant Examiner* — Michael Riegelman
(74) *Attorney, Agent, or Firm* — Baker and Hostetler LLP

(57) ABSTRACT

A link chain has alternating inner and outer chain links connected by a chain articulation, having a direction of motion, wherein each inner chain link has at least one inner plate, and each outer chain link has at least two outer plates and two chain link pins connecting these plates, each pin being rotationally fixed in a pin opening of the associated outer plate and extending through a link opening of the associated inner chain link to form a chain articulation. The inner and/or outer chain links have plate backs contactable with a tensioning rail or guide rail. A forward region of the plate backs in the direction of motion of a part of the inner and/or outer plates extends at an angle to a plane projected between the center lines of the pin openings or link openings. The vertex of the angle points away from the direction of motion.

15 Claims, 3 Drawing Sheets

(56) References Cited

U.S. PATENT DOCUMENTS

| | | | |
|---|---|---|---|
| 5,437,148 A * | 8/1995 | Karp | 59/78 |
| 6,220,981 B1 | 4/2001 | Yoshida | |
| 7,837,583 B2 | 11/2010 | Tohara | |
| 7,963,872 B2 | 6/2011 | Tohara et al. | |
| 8,088,029 B2 | 1/2012 | Tohara et al. | |
| 8,157,683 B2 * | 4/2012 | Korse | 474/230 |
| 2007/0082776 A1 * | 4/2007 | Nagao | 474/230 |
| 2008/0287239 A1 * | 11/2008 | Korse | 474/231 |
| 2010/0267504 A1 | 10/2010 | Miyazawa et al. | |
| 2013/0053194 A1 * | 2/2013 | Yokoyama | 474/91 |
| 2013/0196803 A1 * | 8/2013 | Bodensteiner et al. | 474/140 |

FOREIGN PATENT DOCUMENTS

| | | |
|---|---|---|
| DE | 102008039662 A1 | 4/2009 |
| DE | 102008004595 A1 | 7/2009 |
| DE | 102010013572 A1 | 10/2010 |
| EP | 1878944 A2 | 1/2008 |
| JP | 2000-2304 A1 | 1/2000 |

* cited by examiner

LINK CHAIN WITH INCLINED PLATE BACKS

CROSS-REFERENCE TO RELATED APPLICATION

This application claims priority to foreign German patent application No. DE 102012001812.6, filed on Jan. 31, 2012, the disclosure of which is incorporated by reference in its entirety.

FIELD OF THE INVENTION

The invention concerns a link chain having alternating inner and outer chain links connected to one another by a chain articulation and having a direction of motion, wherein each inner chain link has at least one inner plate, and each outer chain link has at least two outer plates and two chain link pins connecting these plates to one another, each chain link pin is arranged in a rotationally fixed manner in a pin opening of the associated outer plates and extends through a link opening of the associated inner chain link to form a chain articulation, wherein the inner and/or outer chain links have plate backs that can be brought into contact with a tensioning and/or guide rail.

BACKGROUND

A chain of this nature is known from DE 19907865 A, for example. The link plates used in this chain possess plate backs that have two contact portions that are spaced apart from one another and form a receptacle therebetween for lubricating oil. This reduces the contact area for the tensioning and/or guide rail. At the same time, a lubricating oil cushion is formed between the two contact portions as a result of the recessed shape of the plate back. Chains of this type are frequently used as timing chains in internal combustion engines and couple the crankshaft to the at least one camshaft. Such timing drives have a guide rail in the driving side and a tensioning rail in the slack span that can be pressed against the chain by a chain tensioner. Because of the chosen shape of the plate back, the friction between the rails and the chain can be reduced.

A similar design is known from U.S. Pat. No. 7,963,872 B2. These plates also have two contact portions that are spaced apart from one another, with a recessed contour present between them that optimizes the lubricant.

The object of the present invention is thus to provide a link chain of the initially mentioned type that provides improved friction reduction between the chain and a tensioning and/or guide rail.

SUMMARY OF THE INVENTION

This object is attained according to the invention for a generic link chain by the means that at least a forward region of the plate backs in the direction of motion L of at least a part of the inner and/or outer plates extends at an angle to a plane projected between the center lines of the pin openings or link openings, and the vertex of the angle points away from the direction of motion L. In this way, a sort of funnel is formed, into which oil adhering to the slide rail and/or guide rail or chain is forced due to the motion of the chain, thus forming an oil wedge, at least in the forward part of the plate (viewed in the direction of motion L). Plates typically have a rounding on their end faces. These roundings are not part of the plate back, however. In this context, the plate back is understood to mean only the section of the plate that extends between the two center lines of the pin opening or the link opening. However, this also means that the forward section of the plate in the direction of motion L is recessed such that it essentially does not come into contact with the slide rail and/or tensioning rail. In contrast thereto, DE 19907865 A1 and U.S. Pat. No. 7,963,872 B2 each provide a contact area in this forward region. The design according to the invention can be used with link chains, roller chains, or tooth chains.

Preferably, this inclined region extends over at least one fourth of the length, preferably over one third of the length of the plate back.

Preferably, the region of the plate backs that extends at an angle can extend over a distance determined in the direction of motion L that corresponds essentially to the spacing of the center lines of the pin openings or the link openings. This means that essentially the entire plate back is inclined at the specified angle. Such a plate presumably has contact with the corresponding rail only in the rearward region of the plate back in the direction of motion L. However, it can be expected that as a result of the wedge action, a sufficient oil cushion forms so that hydrodynamic lubrication of the chain takes place in one region.

In a favorable manner, according to one variant the angle can be in the range from 1° to 10° or further restricted in the range from 3° to 7°. This relatively small range of angles is sufficient to achieve the desired friction-reducing effect.

According to one embodiment, only inner plates can have plate backs extending at an angle and the plate backs of the outer plates extend essentially parallel to a corresponding plane projected between the center lines of the associated pin openings or link openings. In this design, the usual sliding contact occurs between the outer plates and the rails, in which the straight plate backs slide along the rails. However, the inner plates are provided with an inclined plate back for friction reduction. By this means, stability is maintained in the chain drive, which generally is operated in a highly dynamic manner, and reliable guidance by the guide rails and/or tensioning rails is ensured.

Moreover, the plate backs of adjacent inner and outer plates can be located at essentially the same height at least at one point with a straight link chain and otherwise differ in height from one another. The heights of the inner and outer plates are preferably equal in the rearward region of the plate back in the direction of motion L. Proceeding from this rearward region, the height of the inner plates then decreases in the direction of motion L. Here, at least in the rearward region in the direction of motion L of the plate backs of the inner links, all plates lying parallel to one another in this section are located at the same height, and together stabilize running along the applicable rail.

Preferably, the outer and inner plates can have an identical outer circumferential contour. With an identical outer circumferential contour, identical stamping tools can be used to manufacture both the inner and outer plates. It should be noted in this context that the contour of the pin openings or the link openings does not count as part of the outer circumferential contour.

It is especially desirable in this context for the outer and inner plates to be arranged with mirror-image symmetry about the planes projected between the center lines with regard to the identical outer circumferential contour. This means that the plates are simply installed rotated by 180°. When the plates in question are not toothed, such a chain can run on both its inner and outer sides along a rail in a friction-reduced manner.

To simplify the rotated assembly of the plates in mechanized production of such chains, each plate can accordingly have, above or below the projected plane, a projecting or recessed irregularity in the shape of the outer contour for sorting purposes in addition to the inclined region of the plate back. This can be a notch or a projecting lug that is detected in a suitable manner and subsequently provides for the correct orientation.

In a preferred embodiment, the inner chain link can have at least two inner plates and two link sleeves that connect them together and form the applicable link openings, with the link sleeves being arranged in corresponding sleeve openings of the associated inner plates in a rotationally fixed manner and through which the relevant link pins of the associated outer chain links extend.

Moreover, the invention also relates to a chain drive, in particular a timing chain drive of an internal combustion engine, having a driving sprocket and at least one driven sprocket with a toothless link chain according to any one of claims 1 through 9 placed around the sprockets and at least one tensioning and/or guide rail in contact with the link chain.

BRIEF DESCRIPTION OF THE DRAWINGS

Exemplary embodiments of the present invention are explained in detail below with reference to drawings. The drawings show.

DETAILED DESCRIPTION

Figure 1:
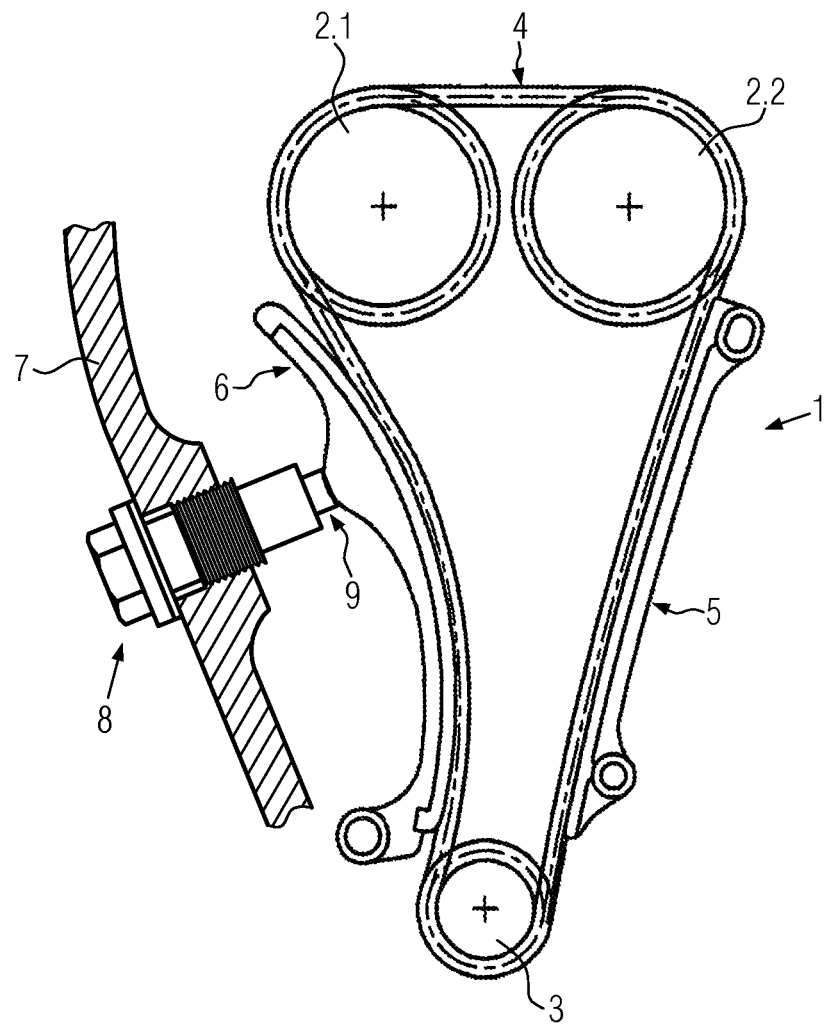
FIG. 1 a timing chain drive according to the present invention.
Figure 2:
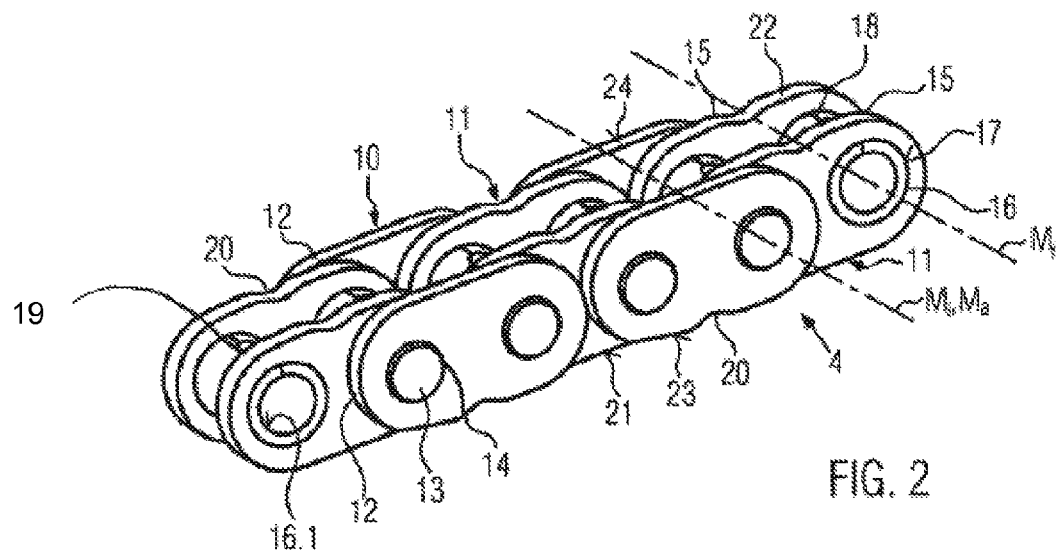
FIG. 2 a perspective view of a first embodiment of the link chain according to the invention, FIG. 3 a side view of the link chain from FIG. 2, FIG. 4 a side view of an outer chain link of the link chain from FIG. 2, FIG. 5 a side view of an inner chain link of the link chain from FIG. 2, FIG. 6 a perspective view of a second embodiment of the link chain according to the invention, FIG. 7 a side view of the link chain from FIG. 6, FIG. 8 a side view of an outer chain link of the link chain from FIG. 6, and FIG. 9 a side view of an inner chain link of the link chain from FIG. 6.
Figure 3:
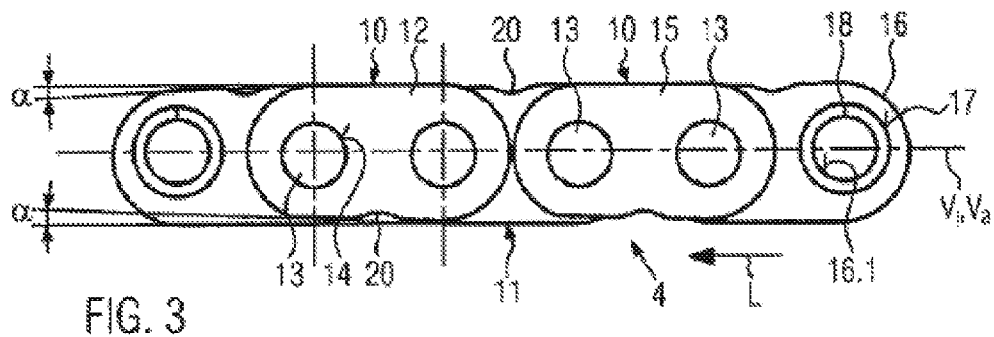
Figure 4:
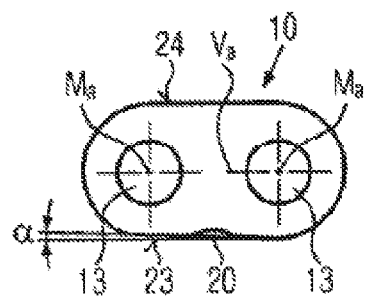
Figure 5:
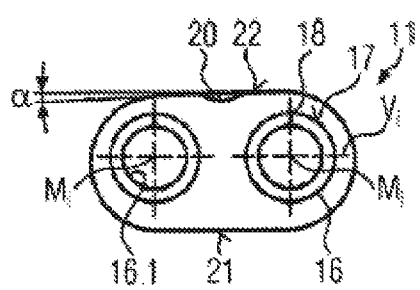
Figure 6:
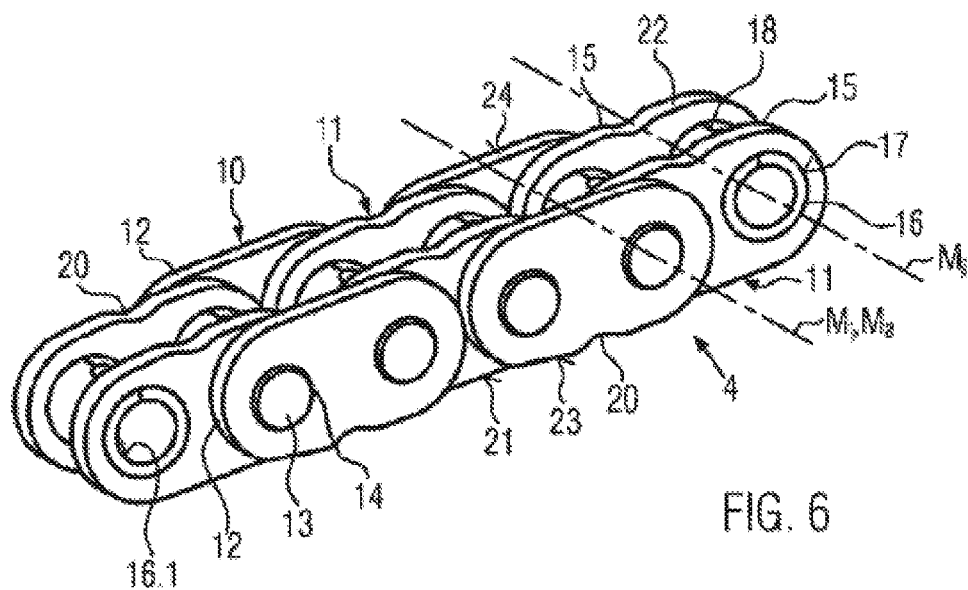
Figure 7:
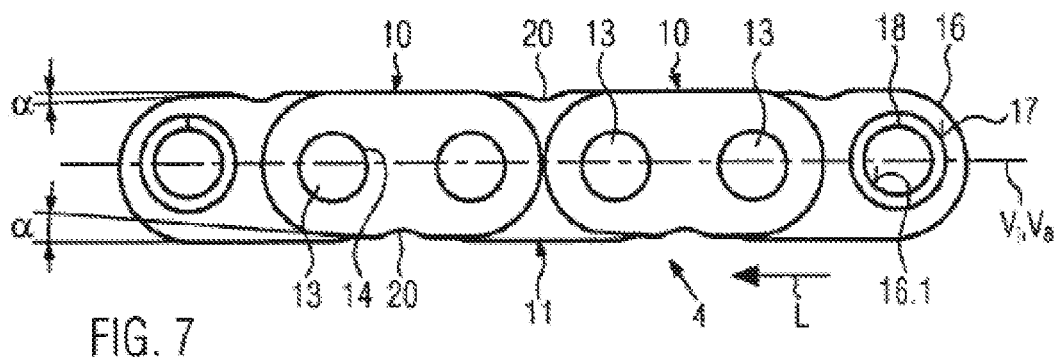
Figure 8:
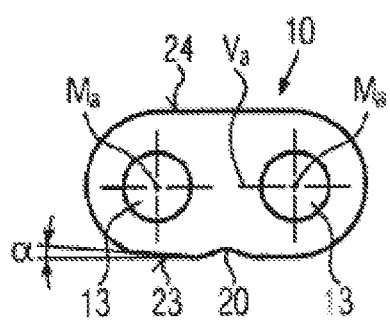
Figure 9:
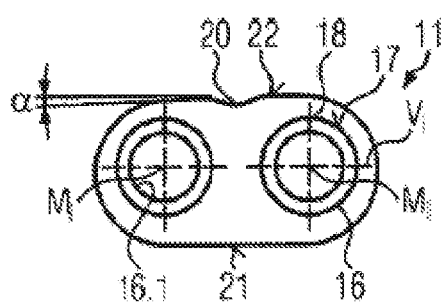

FIG. 1 shows a timing chain drive for an internal combustion engine. The timing chain drive 1 comprises two camshaft sprockets 2.1 and 2.2 located at the top, a crankshaft sprocket 3 located at the bottom, a timing chain 4 passing around them, a slide rail 5, and a pivotably arranged tensioning rail 6 that is pressed against the chain by a chain tensioner 8 screwed into the engine housing 7. The chain tensioner 8 is preferably connected to the engine oil hydraulics, so that its tensioning piston 9 hydraulically presses on the pivotably arranged tensioning rail 6. Both the slide rail 5 and the tensioning rail 6 rest with their bearing layers against the outer side of the timing chain 4 that runs along them. This gives rise to frictional losses, which are reduced as a result of the design of the chain embodiments described below.

The first embodiment of the timing chain 4 described in FIGS. 2 to 5 comprises an alternation of outer chain links 10 and inner chain links 11 connected to one another by means of a chain articulation. Each outer chain link 10 consists of two outer plates 12 arranged spaced apart from one another and two cylindrically shaped chain link pins 13 connecting them. To this end, the chain link pins 13 are pressed into associated pin openings 14 in the outer plates 12 so that they protrude slightly. Each inner chain link 11 consists of two inner plates 15 arranged spaced apart from one another, which are connected to one another by two link sleeves 16 arranged spaced apart from one another. To this end, the link sleeves 16 are pressed into corresponding sleeve openings 17 in the inner plates 15. The link sleeves 16 are rolled from a sheet metal strip, resulting in a butt joint 18, in the center of which is located a lubricant passage 19. For reasons of strength, it may be more advantageous to locate this butt joint 18 offset by 90° from the position shown in FIG. 2.

Together, a chain link pin 13 of an outer chain link 10 and an associated link sleeve 16 of an inner chain link 11, through which this chain link pin 13 extends, form a chain link. The inner side of the link sleeve 16 thus forms the link opening 16.1.

In the embodiment shown, the outer circumferential contours of the inner plates 15 and the outer plates 12 are identical, so that their circumferences are congruent when they are placed upon one another in the correct orientation. Only the thickness of the inner plates 15 is somewhat greater for reasons of strength, since a larger sleeve opening 17 as compared to the pin opening 14 is required for fastening the link sleeves 16. Each of the outer plates 12 and inner plates 15 has an irregularity in the shape of the outer contour in the form of a rounded sorting notch 20 auf. During assembly, this sorting notch 20 helps in assembling the corresponding plates 12, 15 in the correct orientation. In the present case, the sorting notch 20 is located on one side of the plates 12, 15 on the outer circumference precisely between the relevant associated openings 14 or 17. A plane $V_i$ projected between the center lines $M_i$ of the inner plates divides the relevant inner plate 15 into a plate region located above the plane $V_i$ and a plate region located below the plane $V_i$, which are asymmetric with regard to one another. This asymmetry is independent of the sorting notch 20, which can be assumed away in this examination. The plane $V_i$ is perpendicular to the plane of the drawing in FIGS. 2 to 5, so that the two center lines $M_i$ lie in the plane $V_i$.

The outer contour of the outer plates 12 is identical to that of the inner plates 15. However, they are installed rotated by exactly 180°. Consequently, a plane $V_a$ projected between the center lines $M_a$ and the pin openings 14 divides the outer plate 12 into a plate region located above the plane $V_a$ and a plate region located below the plane $V_a$. These two plate regions are shaped asymmetrically with regard to one another (at least in vertical profile). Once again, this view is independent of the sorting notch 20. The plane $V_a$ is perpendicular to the plane of the drawing in FIGS. 2 to 5, so that the two center lines $M_a$ lie in the plane $V_a$.

A top side 24 of the outer plate 12 has a straight plate back, which comes into full-area contact with the slide rail 5 and tensioning rail 6. This time, the asymmetry of the outer plates 12 and the inner plates 15 is accomplished through a beveling of one of the sides at an angle α. In the exemplary embodiment shown, the angle is 5° (and thus lies in the range from 1° to 10°, preferably 3° to 7°). In the present case, the bottom side 23 of the outer plates 12 has the inclination at the angle α, while in contrast to this the top side 22 of the inner plates 15 is inclined by the angle α. In the figures, the angle α is depicted starting from a line in the plane of the drawing parallel to the relevant planes $V_i$ and $V_a$.

The outer plates 12 and inner plates 15 are assembled such that the vertex of the angle α points away from the direction of motion L. The top side 24 of the outer plates 12 and the corresponding associated top side 22 of the inner plate 15 are at equal height at one point, namely precisely above the center line $M_i$ of the rear sleeve opening 17 of the inner plate 15 and front pin opening 14 of the outer plate 12. Starting from this highest point, the height or the spacing of the top side 22 from the plane $V_i$ decreases due to the inclination by the angle α.

On the bottom side of the chain, exactly the reverse takes place. Here, the inner plates 15 provide a straight bottom side 21 that extends parallel to the applicable plane $V_i$ and that could come into full-area contact in the case of an appropriate arrangement or appropriate pressure of a guide or tensioning rail, in contrast to which the associated outer plate 12 is almost completely recessed as a result of the bottom side 23 inclined at the angle α.

Because of the angle orientation, in particular that of the top side 22 of the inner plate 15, a wedge effect arises so that oil, which for lubrication purposes adheres to both the chain 4 and/or the slide rail 5 or tensioning rail 6, is forced into this wedge, thus resulting in better floating of the timing chain 4. In this way, the friction-reducing effect is enhanced still further.

In the present case, for reasons of cost an identical outer contour is used for all plates. This is not strictly necessary, however, as long as at least some of the plates have a suitably shaped inclined plate back on the side of the chain that is to slide along the guide rail or tensioning rail. On the sides that do not slide along the slide rails or tensioning rails, all plates can have straight sides, which preferably lie at the same height when running straight. Furthermore, the invention is also applicable to tooth chains. With tooth chains, it is in any case predetermined from the start which sides are to come into contact with the sprockets and which are to come into operative connection with the slide rails or tensioning rails.

The top side 24 of the outer plates 12 thus constitutes the plate back, which primarily comes into contact with the tensioning or guide rail 5,6. In the case of the inner plates 15, the inclined arrangement causes the top side 22 to make contact only in the region above the rear link opening 16.1 viewed in the direction of motion L. Because the bottom side 21 of the inner plates 15, shown on the bottom of the chain in the figures, is designed as a long straight line (between the center lines $M_i$ of the associated opening 16.1), full-area contact with a rail can occur. Accordingly, the bottom sides 23 of the outer plates 12 are designed to be inclined, and only come into contact with the relevant rail in a rear region viewed in the direction of motion L above the rear pin opening 14. This design has the consequence that the direction of closure of the chain defines whether primarily the inner chain links 11 or the outer chain links 12 come into contact with the rails 5,6. As a general rule, however, it is preferred for the straight top sides 24 of the outer plates 12 to come into contact with the rails. According to one variant, all top sides of the inner and outer chain links can also be provided with a bevel.

An additional embodiment of the present invention is explained in detail below using FIGS. 6 to 9. Only the major differences from the foregoing exemplary embodiment are discussed below, for which reason supplementary reference is made to the above description, with the same reference symbols being used for components having the same construction and effects.

The only difference in this design resides in that the beveling by the angle α takes place only over a subsection of the length of the plate. In the present case, the beveling extends from the forward region of the associated link in the direction of motion L to the notch 20, in contrast to which the rear section viewed in the direction of motion L extends straight (parallel to the plane Vi or $V_a$). The embodiment shown thus involves the beveling at the angle α in the forward region of the top side 22 and, for the outer plate 15, the front region of the bottom side 23 (viewed in the direction of motion L) that is designed to be inclined by the angle α, in contrast to which the rear region is designed to be straight (parallel to the plane Vi or $V_a$). In this embodiment, the notch 20 can also exert an enhanced influence on the lubricating effect, since oil can also collect here.

The invention claimed is:

1. A link chain comprising:
    alternating inner and outer chain links connected to one another by a chain articulation and having a direction of motion, wherein each inner chain link has at least one inner plate, and each outer chain link has at least two outer plates and two chain link pins connecting the at least one inner plate and the at least two outer plates to one another, each chain link pin is arranged in a rotationally fixed manner in a pin opening of the associated outer plates and extends through a link opening of the associated inner plate to form the chain articulation, wherein the inner and/or outer plates have plate backs that extend between center lines of the link opening of the at least one inner plate or the pin openings of the at least two outer plates for contacting a tensioning rail or a guide rail,
    wherein at least a forward region of the plate backs in the direction of motion of at least a part of the inner and/or outer plates includes a length that extends at a constant angle to a plane projected between the center lines of the pin openings or link openings, and the forward region of the plate backs is inclined towards the plane when traced in the direction of motion, and
    wherein the plate backs further include a parallel portion with a straight length, the straight length of the parallel portion being parallel to the plane projected between the center lines of the pin openings or link openings.

2. The link chain according to claim 1, wherein the region of the plate backs that extends at the constant angle extends over a distance determined in the direction of motion that corresponds essentially to the spacing of the center lines of the pin openings or the link openings.

3. The link chain according to claim 1, wherein the constant angle is selected from a range from 1° to 10°.

4. The link chain according to claim 1, wherein the inner plates have plate backs extending at the constant angle.

5. The link chain according to claim 1, wherein the plate backs of adjacent inner and outer plates each have a parallel section with essentially the same height.

6. The link chain according to claim 1, wherein the outer and inner plates have an identical outer circumferential contour.

7. The link chain according to claim 6, wherein the outer and inner plates are arranged with mirror-image symmetry about the plane projected between the center lines with regard to the identical outer circumferential contour.

8. The link chain according to claim 6, wherein each plate accordingly has a projecting or recessed irregularity in the shape of the outer contour above or below the plane projected between the center lines for sorting purposes in addition to the inclined forward region of the plate back.

9. The link chain according to claim 1, wherein the inner chain link has at least two inner plates and two link sleeves, the two link sleeves connecting the at least two inner plates to one another and forming the link openings, which link sleeves are arranged in corresponding sleeve openings of the associated inner plates in a rotationally fixed manner and through which the associated chain link pin of the associated outer chain link extends.

10. A chain drive, in particular a timing chain drive of an internal combustion engine, having a driving sprocket and at least one driven sprocket, having a link chain according to claim 1 placed around the sprockets, and at least one tensioning and/or guide rail in contact with the link chain.

11. The link chain according to claim 1, wherein the constant angle is selected from a range from 3° to 7°.

12. The link chain according to claim 1, wherein the inner and/or outer chain links includes a sorting notch for identification during a mounting process.

13. The link chain according to claim 12, wherein an outer circumferential contour of at least one inner plate of the inner chain links defines the sorting notch and the outer circumferential contour is asymmetrical.

14. The link chain according to claim 12, wherein an outer circumferential contour of at least one outer plate of the outer chain links defines the sorting notch and the outer circumferential contour is asymmetrical.

15. The link chain according to claim 1, wherein the parallel portion and the forward region of the plate backs extend between center lines of the pin openings of the two chain link pins.

\* \* \* \* \*